UNITED STATES PATENT OFFICE.

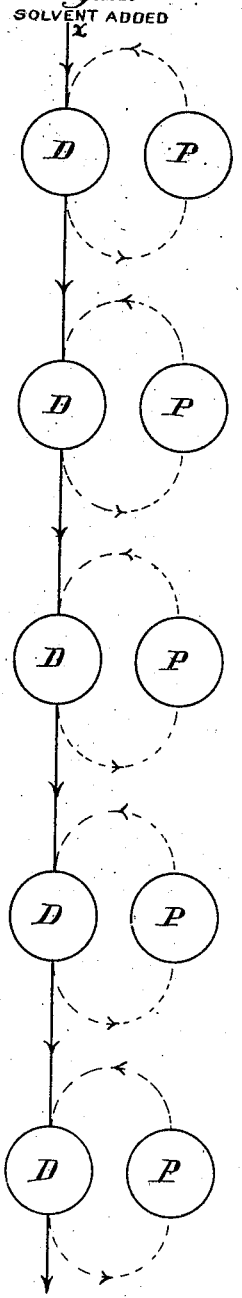
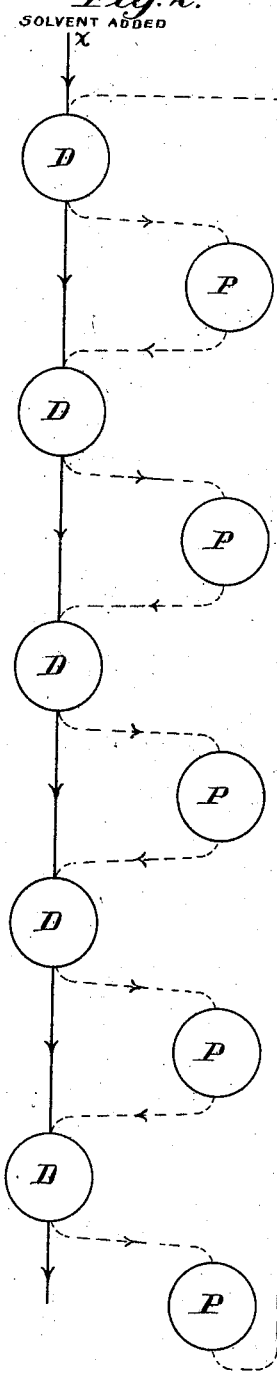
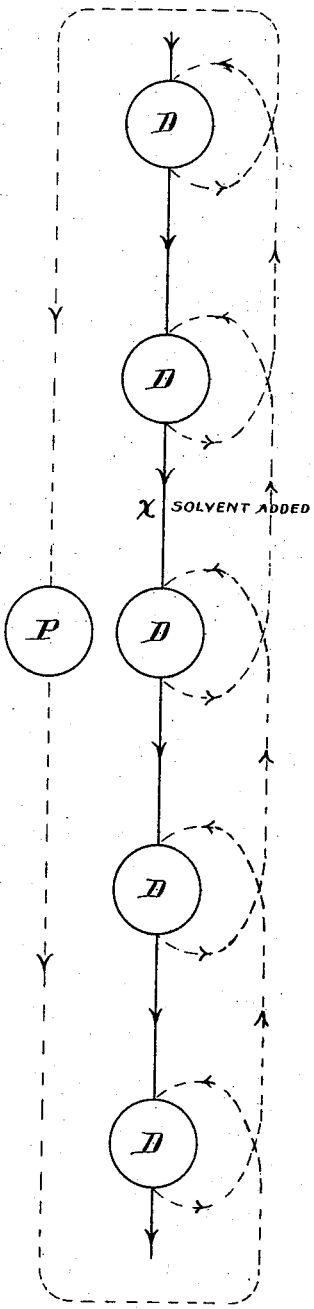

RUDOLF GAHL, OF MORENCI, ARIZONA.

PROCESS OF TREATING ORES.

1,021,769.   Specification of Letters Patent.   Patented Apr. 2, 1912.

Application filed August 29, 1911. Serial No. 646,684.

*To all whom it may concern:*

Be it known that I, RUDOLF GAHL, a subject of the Emperor of Germany, residing at Morenci, in the county of Greenlee and State of Arizona, have invented certain new and useful Improvements in Processes of Treating Ores, of which the following is a specification.

This invention relates to processes of treating ores, the object of the invention being the provision of an economical and efficient process for the preparation of metal-bearing solutions from which the metals may be recovered by precipitation.
The invention is applicable with particular advantages to the treatment of copper ores, but is likewise applicable to other materials, as for example the recovery of gold and silver by the cyanid process.
The extremely finely divided ore formed by crushing and grinding and termed "slime" is preëminently adapted for treatment in accordance with my invention, although coarser materials, as for instance fine sands or mixtures of sands and slimes, may also be treated advantageously.

In leaching fine ores, one of the principal difficulties encountered is in separating the liquid from the solid matter. Filtering has come into extensive use of late, but in addition to its high cost it presents practical difficulties in the treatment of certain classes of ore. Furthermore, the construction of filter presses and vacuum filters which will withstand the corrosive action of such chemical agents as are used for example in leaching copper ores, presents difficulties. The well known decantation process avoids these difficulties but necessitates a large plant and is expensive in operation. An improvement over the ordinary intermittent decantation process would be a continuous or essentially continuous process of this kind, as has been occasionally suggested.
The present invention relates to processes of this character.

The invention will be explained by reference to the accompanying drawings, wherein:—
Figures 1 and 2 represent in a diagrammatic manner the sequence of operations in processes of continuous decantation; and Fig. 3 indicates the sequence preferably employed in accordance with the present improvement.

In carrying out a continuous decantation process, the pulp, after having been treated with a suitable leaching solution, is separated from a large portion of the solution by the first settling. The thickened pulp is then mixed with a solution containing a lower percentage of the economic metal than the solution first decanted, and is transferred to another settling tank. This operation is repeated often enough to reduce as far as may be considered practicable the content of economic metal in the solution covering the pulp.

Ignoring in the interest of simplicity the existence of means for effecting the mixture, each settling tank will receive two feed products, namely, thickened pulp and solution, and will yield two products which are likewise thickened pulp and solution. Figs. 1 and 2 of the drawings represent simple arrangements for accomplishing this result. In said figures, D, D represent means for settling, hereinafter referred to as settling tanks; and P, P represent means for precipitating metal, hereinafter called precipitating plants. Means for mixing, agitating, aerating, etc., are commonly used but may be here left out of consideration. In all figures the solid lines represent the direction of flow of thickened pulp, while the dotted lines represent the direction of flow of the solution or supernatant liquid.

In the process indicated by Fig. 1 the decanted solution from each tank D is sent to a corresponding precipitating plant P, and thence returned to the head of the settling tank to be mixed with the feed. In the process indicated by Fig. 2 the liquid decanted from the first settling tank D passes through a precipitating plant to the second settling tank; the liquid decanted from the second tank passes through a precipitating plant to the third settling tank, and so on, while liquid decanted from the last tank is returned to the head of the first tank after having passed through a precipitating plant. It will be observed that according to each of these diagrams a precipitating plant is required in connection with each settling tank.

I have found that results superior in efficiency and economy of extraction and with reduced consumption of solvent are secured by following the method indicated in Fig. 3. According to this treatment the solution decanted from the last tank in series is fed to the last but one, while the solution decanted from this tank is fed to the tank immediately preceding it in series, and so on throughout the series. The solution decanted from the first tank in series is sent to a precipitating plant and then returned to the last tank. Meantime the thickened pulp passes regularly through the series from the first tank to the last.

This system, in addition to the special advantages hereinafter pointed out, possesses the obvious advantage that one precipitating plant only is required for the series of decanting vessels, a thorough washing being nevertheless secured. In proceeding according to this arrangement it is highly advantageous to introduce the leaching agent or solvent, not at the head of the system as has always been practiced heretofore, but at an intermediate point, for instance at the point indicated by X in Fig 3. It is preferable to introduce the leaching agent at a point where the pulp contains a minimum of water, as a higher extraction is thus obtained than when the agent is mixed with a more dilute pulp.

By introducing the leaching agent at an intermediate point the following advantages are gained:

(1.) It is a known fact that leaching is far from being perfect when carried out in a single operation, even though this operation may be greatly prolonged. The leaching agent is never completely consumed, but a certain percentage remains unchanged in the leaching tank, as determined by the laws of chemical mass action. According to the present invention the undecomposed portion of the leaching agent is largely transferred with the solution to the preceding tank (counting in the order of the flow of the thickened pulp). There it encounters fresh pulp on which it exercises its solvent effect. Any leaching agent which may yet remain unchanged finds another opportunity for exercising its solvent action in the head tank of the series. In other words, by introducing the leaching agent at some point below the head of the system the advantage is gained that the leaching takes place by the action of a counter current, nearly exhausted pulp being treated by fresh leaching liquor, while fresh pulp is brought in contact with partly exhausted leaching liquor. At the same time the liquid flowing from the precipitating plant is available for the thorough washing of the pulp in the last tanks of the series.

(2.) In the case of copper ores treated with solutions containing iron salts with subsequent precipitation by iron, a further advantage results from conducting the flow as indicated in Fig. 3. As mentioned above, the partly exhausted leaching solution is brought into contact with fresh ore and the ferric salts are thereby transformed into ferrous salts and the consumption of metallic iron is reduced nearly to the theoretical limit. This is for the reason that the loss of iron resulting from the passage of ferric salts to the precipitating plant is substantially avoided.

(3.) An additional advantage is secured in case the circulating pulp is heated for the purpose of improving the extraction. Heat, for instance in the form of steam, is preferably applied either at the same point as the leaching agent or at another intermediate point of the plant. As may be seen by tracing the manner in which the heat thus introduced distributes itself over the system, the advantages are gained, that the heat is applied where it is most needed, namely, in the final leaching; that it is used to preheat the inflowing pulp; and that the loss of heat due to the outflow of heated pulp is relatively low, as the temperature decreases toward the end of the system.

It will be understood that the flow of pulp and liquid through the system may be either continuous or intermittent as may be desired. It will be observed that whereas the flow of thickened pulp and supernatant liquid may be in the same direction through individual vessels of the series, their resultant flow through the series of vessels is in opposite directions.

It is to be understood that the mode of application of the invention may be variously modified without departing from the spirit of the invention. To some of such modifications it is desired to call particular attention.

(1.) The flow-sheet of the plant may be modified, for instance, by combining the principles illustrated in Figs. 1 and 3, or 2 and 3.

(2.) The number of settling tanks used will depend upon the value of the ore treated and other considerations. It is by no means necessary to use five tanks, the number chosen for purposes of illustration.

(3.) The purpose of the settling tanks is to effect a separation between solid matter and solution. It is, however, not necessary that the solutions should be perfectly free from solid material, but merely that the solution which flows to the precipitating plant should be reasonably clear. In case the overflow from the first settling tank is not sufficiently clear, its action may be supplemented by a clarifying tank or filter.

(4.) The diagrammatic illustrations are based on the assumption that the thickened pulp runs by gravity from tank to tank, while the supernatant solutions are pumped from tank to tank. This arrangement may be reversed, or the tanks may be placed on virtually level ground and the circulation both of the thickened pulp and solution may be accomplished by pumping.

I claim:—

1. The process of treating ores by decantation to prepare metal-bearing solutions, which consists in causing thickened pulp and a supernatant liquid to traverse a series of decanting vessels in resultantly opposite directions, and introducing a leaching agent at a point intermediate the ends of the series.

2. The process of treating ores by decantation to prepare metal-bearing solutions, which consists in causing thickened pulp and a supernatant liquid to traverse a series of decanting vessels in resultantly opposite directions, and introducing a leaching agent and applying heat at a point or points intermediate the ends of the series.

3. The process of treating ores to recover values therefrom, which consists in causing thickened pulp and a supernatant liquid to traverse a series of decanting vessels in resultantly opposite directions, introducing a leaching agent at a point intermediate the ends of the series, and precipitating the values from the outflowing liquid.

4. The process of treating ores to recover values therefrom, which consists in causing thickened pulp and a supernatant liquid to traverse a series of decanting vessels in resultantly opposite directions, introducing a leaching agent at a point intermediate the ends of the series, precipitating the values from the outflowing liquid and returning the same to the opposite end of the series.

In testimony whereof, I affix my signature in presence of two witnesses.

RUDOLF GAHL.

Witnesses:
H. BRUMLAP,
F. C. BLICKENSDERFER.

Copies of this patent may be obtained for five cents each, by addressing the "Commissioner of Patents, Washington, D. C."